(12) United States Patent  
Sacks

(10) Patent No.: US 8,224,862 B2  
(45) Date of Patent: Jul. 17, 2012

(54) SYSTEM AND METHOD FOR PROVIDING A NETWORKED VIRAL FAMILY TREE

(75) Inventor: David Sacks, Beverly Hills, CA (US)

(73) Assignee: Geni, Inc., West Hollywood, CA (US)

( * ) Notice: Subject to any disclaimer, the term of this patent is extended or adjusted under 35 U.S.C. 154(b) by 366 days.

(21) Appl. No.: 12/014,059

(22) Filed: Jan. 14, 2008

(65) Prior Publication Data

US 2008/0172407 A1 Jul. 17, 2008

Related U.S. Application Data

(60) Provisional application No. 60/884,807, filed on Jan. 12, 2007.

(51) Int. Cl.  
*G06F 7/00* (2006.01)

(52) U.S. Cl. .................. 707/797; 707/805; 715/767

(58) Field of Classification Search .................. None  
See application file for complete search history.

(56) References Cited

U.S. PATENT DOCUMENTS

| | | | | |
|---|---|---|---|---|
| 5,950,193 | A * | 9/1999 | Kulkarni | 1/1 |
| 6,373,488 | B1 * | 4/2002 | Gasper et al. | 345/427 |
| 6,801,229 | B1 * | 10/2004 | Tinkler | 715/853 |
| 2002/0171687 | A1 * | 11/2002 | Li et al. | 345/853 |
| 2003/0009439 | A1 * | 1/2003 | Lee | 707/1 |
| 2003/0014422 | A1 | 1/2003 | Notargiacomo et al. | |
| 2005/0116954 | A1 * | 6/2005 | Ripps et al. | 345/440 |
| 2005/0149497 | A1 | 7/2005 | Cookson et al. | |
| 2006/0036696 | A1 * | 2/2006 | Maresh | 709/206 |
| 2006/0167944 | A1 * | 7/2006 | Baker | 707/104.1 |
| 2006/0173963 | A1 | 8/2006 | Roseway et al. | |
| 2006/0224631 | A1 * | 10/2006 | Kwon | 707/104.1 |
| 2006/0288023 | A1 | 12/2006 | Szabo | |
| 2007/0266003 | A1 | 11/2007 | Wong et al. | |
| 2008/0103784 | A1 * | 5/2008 | Wong et al. | 705/1 |
| 2008/0108027 | A1 * | 5/2008 | Sallin | 434/154 |

FOREIGN PATENT DOCUMENTS

WO PCT/US2008/051020 7/2008

* cited by examiner

*Primary Examiner* — Vei-Chung Liang  
(74) *Attorney, Agent, or Firm* — Orrick, Herrington & Sutcliffe

(57) ABSTRACT

A system and method for a networked viral family tree are disclosed. According to one embodiment, a computer-implemented method, comprises receiving a first profile from a first client. The first profile includes a first e-mail address. A second e-mail address is received from the first client. The second e-mail address is associated with a second profile. The second profile is created dynamically when the client provides the second e-mail address. An invitation is sent to the second e-mail address to provide additional profile information associated with the second profile. One or more relationships are associated to the first profile and the second profile to generate a family tree. One or more user interfaces is provided through which the first client provides a plurality of e-mail addresses corresponding to members of the family tree and are associated with of a plurality of profiles.

20 Claims, 9 Drawing Sheets

|   |   |   |   |   |
|---|---|---|---|---|
| 601 | 602 | 603 | 604 | 605 |
| Basics | About Me | Contact | My Life | Favorites |

620 → Name — First / Middle / Last / Suffix [Select ▼]

621 → E-mail Address [_____] [Add from address book]

622 → Gender  (●) Male   ( ) Female

623 → Birthday — Month [Select Month ▼]  Day [▼]  Year [▼]   ☑ Living relative — 610

624 → Place of Birth — Country [United States ▼]  City, State/Province [____]

625 → Current Location — [United States ▼] [____]

626 → Occupation [____]

626 ↓ [cancel]    627 ↓ [save]

| Generation | Individual |
|---|---|
| -2 | Justine's grandfather |
| -1 | Justine's mother |
| 0 | Justine (focus of tree map) |
| +1 | Justine's daughter |
| +2 | Justine's grandson |

| profiles |
|---|
| id |
| created_on |
| updated_on |
| profile_type |
| first_name |
| last_name |
| middle_name |
| mugshot_id |
| claimed |
| password |
| last_login |
| gender |
| set_password |
| link_nonce |
| birth_order |
| is_alive |
| tree_id |
| maiden_name |
| added_onto |
| create_by |
| deleted_at |
| suffix |
| not_emailable |
| joined |
| display_name |
| confirmed_alive |
| fbook_uid |
| fbook_session_key |
| solr_index_version |
| encrypted_password |
| claiming_email_id |
| viral_loop_status |
| birth_id |
| death_id |
| last_invite_time |
| manager_id |
| merge_status |
| burial_id |
| baptism_id |

Figure 9A

| my_family_invitations |
|---|
| id |
| inviter_id |
| invitee_id |
| log_id |
| link_key |
| pending |
| accepted |
| created_on |
| updated_on |
| cancelled |

Figure 9B

SYSTEM AND METHOD FOR PROVIDING A NETWORKED VIRAL FAMILY TREE

The present application claims the benefit of and priority to U.S. Provisional Patent Application No. 60/884,807 filed on Jan. 12, 2007, and is hereby incorporated by reference.

FIELD

The field of the invention relates generally to network-enabled online service systems and more particularly relates to a system and method for providing a networked viral family tree.

BACKGROUND

Internet technology has been growing at an overwhelming pace and has become an essential part of our lives. In particular, Web-based Internet technology gained its popularity for ease of use, ubiquitous connectivity and accessibility to a vast amount of information and services. The advancement in Internet technology makes possible things that were once considered difficult or even impossible. Numerous business models based on the Internet have come and gone, and some are still thriving and deeply integrated into our daily lives and work. One can find such examples in businesses from Internet portals, E-commerce, search engines, forums, online gaming, entertainment, user-created content, social networking services, etc. Particularly, social networking has lately become one of the fastest growing fields in the Internet-based business sector with the advent of new Web technologies, better known as Web 2.0, in addition to the rapid proliferation of high-speed broadband Internet connectivity available for the general public. More and more Internet users can access technology-packed Web sites with little or no knowledge about the technologies on which those Web sites are built. Advanced Web technology has enabled feature-rich and interactive, thus more user-friendly, development of Web sites.

Most of the Internet services strictly rely on online advertisement to generate revenues: the company runs a Web site and receives fees from advertisers to post their advertisements. In return, they show their advertisements on the Web site to visitors. Alternatively, the company may run a Web site that primarily relays a useful piece of information to the users and receives subsidized fees based on the amount of redirected traffic to the host Web sites operated by the fee-paying advertisers. Nevertheless, the more traffic that a Web site generates, the more profitable the Web site is, since it has more exposure to potential customers.

SUMMARY

A system and method for a networked viral family tree are disclosed. According to one embodiment, a computer-implemented method, comprises receiving a first profile from a first client. The first profile includes a first e-mail address. A second e-mail address is received from the first client. The second e-mail address is associated with a second profile. The second profile is created dynamically when the client provides the second e-mail address. An invitation is sent to the second e-mail address to provide additional profile information associated with the second profile. One or more relationships are associated to the first profile and the second profile to generate a family tree. One or more user interfaces is provided through which the first client provides a plurality of e-mail addresses corresponding to members of the family tree and are associated with of a plurality of profiles.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

FIG. 6 illustrates an exemplary user interface for entering information associated with a node, according to one embodiment;

FIG. 9A is an exemplary database table for a user profile, according to one embodiment;

FIG. 9B is an exemplary database table for an invitation, according to one embodiment;

DETAILED DESCRIPTION

Figure 1:
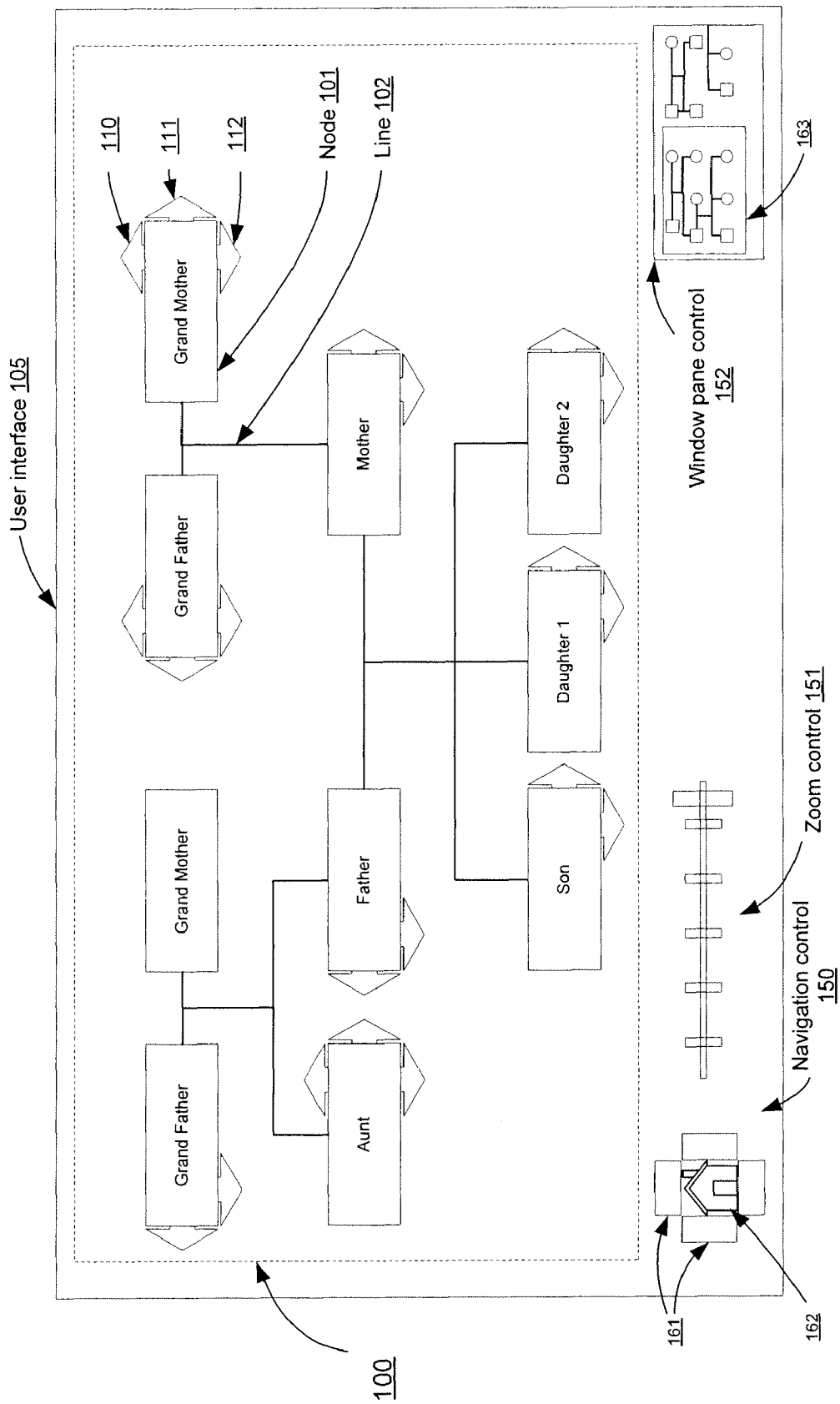
FIG. 1 illustrates an exemplary Web-based user interface providing a family tree, according to one embodiment.

A system and method for a networked viral family tree are disclosed. According to one embodiment, a computer-implemented method, comprises receiving a first profile from a first client. The first profile includes a first e-mail address. A second e-mail address is received from the first client. The second e-mail address is associated with a second profile. The second profile is created dynamically when the client provides the second e-mail address. An invitation is sent to the second e-mail address to provide additional profile information associated with the second profile. One or more relationships are associated to the first profile and the second profile to generate a family tree. One or more user interfaces is provided through which the first client provides a plurality of e-mail addresses corresponding to members of the family tree and are associated with of a plurality of profiles.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

According to one embodiment, the present system provides a networked viral family tree on a Web site having the following characteristics:

(1) Interface: users go to a Web site provided by the system to create their family tree. The user experience is built around an interactive "tree map" where users first create a node representing themselves and add connecting nodes for their family members. The map takes care of positioning individual nodes, drawing lines to interconnect them and displaying basic information such as names, thumbnail photos and status. The map extends to include such generic features as panning, zooming and automatic re-centering.

(2) Viral: users creating a family tree may enter a relative's e-mail address as part of adding that relative's node, whereupon the relative is e-mailed an invitation to join the family tree. The relative can join the family tree by clicking a link in the e-mail, whereupon the relative is taken to the same family tree already created by the original user but re-centered from the relative's point of view. The relative can then add other nodes to the tree and invite other relatives to join by the same fashion the original user invited the relative. As more relatives join, the family tree is self-populated in a "viral" manner.

(3) Networked: because all of the relatives are working on the same family tree, the family tree is a collaborative project owned by all of the participating family members. User's personal data and collaboratively owned data to the family tree are stored and maintained on a central server to avoid duplicate copies of data on each member's personal storage. When more than one family tree overlaps, the system merges them.

(4) Profiles: each node in the family tree links to a profile of that person, providing such information as name, photos, birthplace, birth date, hometown, physical appearance, likes and dislikes and so on. Living relatives who participate in the tree will maintain their own profile. The profiles of deceased ancestors or living relatives who do not participate will be maintained by the living participants by collaborative efforts, similar to the family tree itself. A user's profile will not only provide information about the person and the relationship to the rest of the family, but also allows the user to stay in touch with the rest of the family through a variety of features such as messaging, file and picture sharing, etc.

According to one embodiment, a system and method for providing an interactive family-based social community is disclosed. The system and method also provides an educational tool, guided by the interactive medium, for those who have little or no knowledge of genealogical terms and concepts. The constituent family members of a family community can individually or jointly contribute to the expansion and the maintenance of their family community by constantly updating their information and profiles to construct a "living" family-based network.

According to another embodiment, the system and method provides advanced interactive content to enhance the user's experience when interacting with other members of the community. The support of multimedia content, the ease of uploading and downloading of the multimedia content and the ease of exchanging the multimedia content among the community members makes the user experience more pleasant and enjoyable.

A family tree is composed of many constituent family members and the interconnection among them. Some members may join the community and contribute to the community as participants, but some members may not join or not even know about the existence of such a community. Profiles of nonparticipating members can be created on behalf of them by the participating members. In this case, the profiles of nonparticipating members become the property of the community until the nonparticipating members join the community and claim ownership of the profile. Alternatively, the participant who prefers not to claim ownership may still participate in the community but may have limited accessibility to the features that would otherwise be accessible. When the ownership of a node within a family tree is claimed, the claiming member may set a password to gain special access to the node such as updating photos, posting group messages, posting pictures, etc. Each family tree map is drawn from the viewpoint of the member focusing one's own node at the center of the viewing window so that the relationship of the family tree is presented with the focus of the member. The focused member of a family tree is herein referred to as a "focus member," "focus individual" or "focus participant," or the like.

Among the unclaimed nodes within a family tree, the nodes for the deceased or ancestors can be added by a participating member of the family tree. Those added nodes of the deceased or ancestors can be co-maintained by the rest of the family depending on a user's relationship to the unclaimed nodes. The accessibility may be granted or arbitrarily changed by the family community or the service provider who provides the family tree map.

According to one embodiment, the display of a node within a family tree may be affected by the status or the ownership of the node. For example, if the node is unclaimed, it will display an "edit info" link on the node to allow other family members to edit the profile of the member represented by the node. The display of a node is also a data-driven experience, therefore the views on the family tree are updated when new information is uploaded by the members of the family. The display and features of a family tree may be presented differently depending on the status of the member and his/her personal contribution to the family community. For example, a guest or a member who did not claim a node within a family tree will not be allowed to edit community-owned properties.

A family tree hosted by the system is treated as a community property owned by the members of the family. The family tree contains family members who are related by blood, adoption or marriage. Each member may define a personalized view of the family tree, called "My Family," for providing a customized display for that particular member. "My Family," in a sense, is a customized family tree, in graphical or text formats, showing favorite family members and the latest updates on the family community. Various links to external Web sites and RSS feeds might be added to one's "My Family" link for easy access to other content available elsewhere on the Internet.

The display of a family tree is presented with navigational features so that the map can be zoomed in and out, panned up/down or left/right, re-centered or refocused. Re-centering is the simple repositioning of the map to put a clicked node in the middle of the screen. Refocusing presents a new set of family tree data and redraws the family map, possibly from another individual's point of view. For example, a user clicks on a spouse of a blood relative, then the family of the spouse of the blood relative is drawn to the center of the screen and populated with information of the spouse as the focal point of the family tree. Using the re-centering and refocusing features, a new display can be selected showing a different perspective of the tree map.

FIG. 1 illustrates an exemplary Web-based user interface 105 providing a family tree, according to one embodiment. The Web-based user interface 105 includes navigation control 150, zoom control 151 and window pane control 152 within the user interface 105. According to one embodiment, a family tree has the following components: a family tree map 100, plurality of nodes 101, plurality of profile entry interfaces 600 and lines 102 interconnecting nodes 101 in one way or another.

A family tree contains all of the nodes that represent family members. Family tree map 100 expands to dynamically fit the available space in the user interface 105 displaying as many nodes as possible.

Each node 101 displays basic information about the family member that it represents. Each node 101 provides links to the member's profile and controls for editing the member's information. Node 101 also facilitates the addition of new members who are closely related to the member.

An unclaimed node is treated as community property of a family tree until it is claimed by the family member that the node represents. While unclaimed, an "edit info" link on the node allows other family members to edit the profile of the member represented by the node. An "edit info" link may appear to a claimed node whose profile is not yet entered.

Line 102 indicates the relationships drawn between nodes 101. A different weight (e.g., full strength or lighter strength) and line types (e.g., solid, dotted, etc.) are used to visualize the relationship between the nodes 101. For example, a dotted line might be used to connect a divorced couple while a solid line symbolizes a currently married couple.

As a family tree map 100 contains dozens or even hundreds of nodes 101, navigation control 150, zoom control 151 and window pane control 152 allows for the repositioning, panning and zooming of the family tree map 100. Added to these navigation features are: zoom slider bar 151 to scale the entire family map 100 up and down; four major directional arrows 161 and an icon/photo 162 of the user in the middle for re-centering the family map 100; and thumbnail 163 shown as an inset rectangle to display all nodes at once within a larger map by highlighting the viewing area of family tree map 100.

Figure 2:
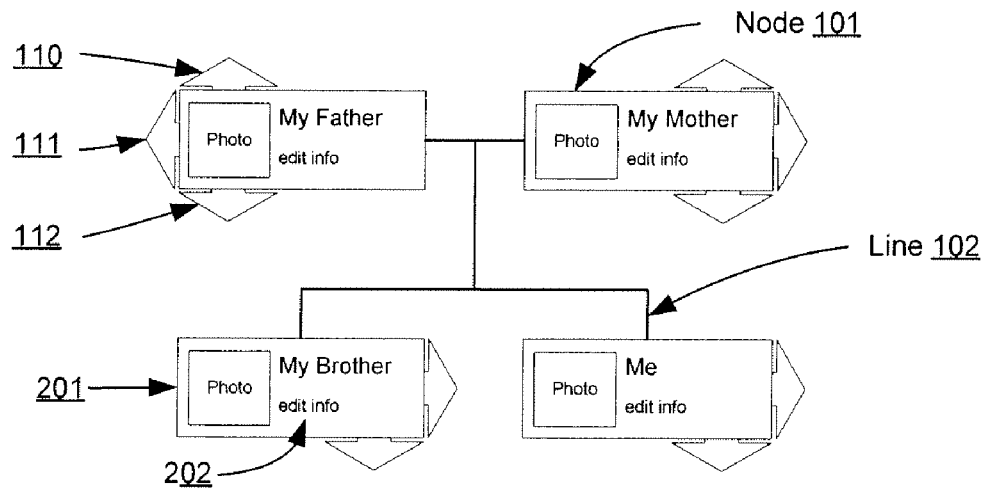
FIG. 2 illustrates an exemplary user interface providing a simplified family tree map, according to one embodiment.

FIG. 2 illustrates an exemplary user interface providing a simplified family tree map 100, according to one embodiment. The simplified family tree map 100 is composed of my father's node, my mother's node, my brother's node and my node. Each member of a family tree map 100 is represented by a small rectangular node displaying the name, thumbnail photo 201, an "edit info" link 202 if the user is authorized to edit the particular node, a "view tree" link and arrows 110-112 to add, delete or edit other related nodes. Node 101 displays different combinations of content and/or controls depending on the state of the profile and the current user's authorization level. If a user does not have an editable authority to a node, he/she would not see the "edit info" link 202 on that node. If a user has blocked editing of his/her own descendents, other members of the family may not see the down arrow 112 from the blocked node.

Figure 3:
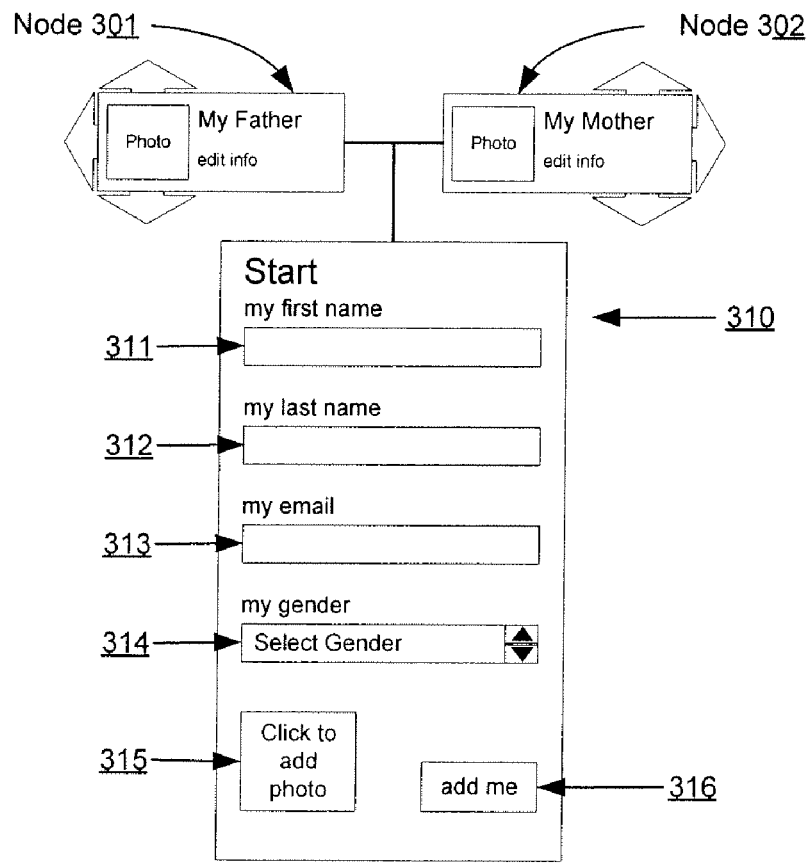
FIG. 3 illustrates an exemplary user interface for creating a new family tree, according to one embodiment.

FIG. 3 illustrates an exemplary user interface for creating a new family tree, according to one embodiment. If the new user did not receive an invitation to join a particular family tree, a new family tree is created by creating a self node of the new user. The new family tree starts with my father's node 301, my mother's node 302 and an interface to enter the new user's profile 310. The user enters basic profile information such as first name 311, last name 312, a primary email 313, gender 314 and a thumbnail photo 315. The father's node 301 and mother's node 302 are automatically created. When the user's profile is submitted by clicking the "add me" button 316, the service provider may initiate a search for a possible duplicate family tree on its database, based on the information provided by the user. When there are potential conflicts or matches, the user is notified to verify if his/her family tree has already been created by other family members. When there is a match, the profile of the user is moved into the database of the existing family tree instead of creating a new family tree.

When at least one user has been added to a family tree, any user subsequently joining the family tree can view and edit the family tree. Users are allowed to add numbers of new nodes to the family tree as well as repositioning and reordering those newly created nodes. Any conflict or inconsistent addition of a family member within a family tree will be notified to the rest of the family members to take an appropriate action.

To edit a new profile, the user clicks the "edit info" link, which opens a profile entry interface 600 as shown in FIG. 6. A profile entry interface 600 contains text-editable or selectable fields that are part of the associated member's profile. A profile entry interface 600 appears both when the owner of the node edits his/her own profile and when a community member opens an unclaimed node to edit the profile of the member represented by the unclaimed node.

Figure 4A:
FIGS. 4A-4K illustrate exemplary nodes within a family tree map showing particular status and type attributes, according to one embodiment.
Figure 4D:
Figure 4G:
Figure 4B:
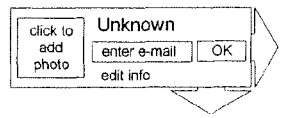
Figure 4E:
Figure 4H:
Figure 4C:
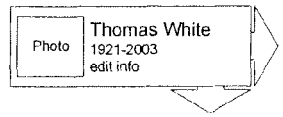

FIGS. 4A-4K illustrate exemplary nodes within a family tree map showing particular status and type attributes. FIGS. 4A and 4B illustrate exemplary unclaimed nodes within a family tree map 100 that wait for inputs of an e-mail address. FIG. 4C illustrate an exemplary node for a deceased member within a family tree map 100. "Edit info" links for the unknown and deceased nodes are still available to other family members since they are accessible by the community. FIG. 4D is an exemplary claimed node. When the owner of the node is currently are automatically created. When the user's profile is submitted by clicking the "add me" button 316, the service provider may initiate a search for a possible duplicate family tree on its database, based on the information provided by the user. When there are potential conflicts or matches, the user is notified to verify if his/her family tree has already been created by other family members. When there is a match, the profile of the user is moved into the database of the existing family tree instead of creating a new family tree.

When at least one user has been added to a family tree, any user subsequently joining the family tree can view and edit the family tree. Users are allowed to add numbers of new nodes to the family tree as well as repositioning and reordering those newly created nodes. Any conflict or inconsistent addition of a family member within a family tree will be notified to the rest of the family members to take an appropriate action.

To edit a new profile, the user clicks the "edit info" link, which opens a profile entry interface 600 as shown in FIG. 6. A profile entry interface 600 contains text-editable or selectable fields that are part of the associated member's profile. A profile entry interface 600 appears both when the owner of the node edits his/her own profile and when a community member opens an unclaimed node to edit the profile of the member represented by the unclaimed node.

Figure 4F:
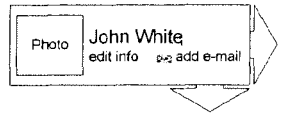
Figure 4I:
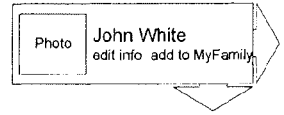
Figure 4J:
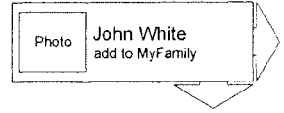
Figure 4K:
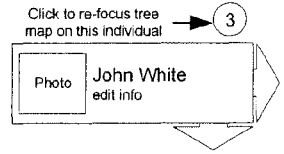

FIGS. 4A-4K illustrate exemplary nodes within a family tree map showing particular status and type attributes. FIGS. 4A and 4B illustrate exemplary unclaimed nodes within a family tree map 100 that wait for inputs of an e-mail address. FIG. 4C illustrate an exemplary node for a deceased member within a family tree map 100. "Edit info" links for the unknown and deceased nodes are still available to other family members since they are accessible by the community. FIG. 4D is an exemplary claimed node. When the owner of the node is currently logged-in on the Web site, a "chat now" icon appears on the thumbnail photo of the member as shown in FIG. 4E. If a claimed node has an empty e-mail address, an "add e-mail" link is always shown until an e-mail is entered as shown in FIG. 4F. An invitation or a reminder can be sent to a claimed node as shown in FIGS. 4G and 4H respectively. A direct link to "add to MyFamily" in FIGS. 4I and 4J allows a family member to add a claimed family node in his/her shortcut link for convenience. A refocus icon may appear for a node to refocus the family tree map on the node as shown in FIG. 4K. It is noted that various other options and links can be added to facilitate user input, displays and features.

Each member of a family tree map 100 can add relatives when arrows 110-112 are selected. A dynamic add-relative menu appears adjacent to the node when the user hovers over the arrows 110-112. Upon clicking on the arrow, the user is prompted with a small edit window or a profile entry interface 600 that allows entering of the new relative's name, e-mail address, etc. The user exits the edit mode by clicking the "save" button and the new relative's node appears connected by a line. The family tree map 100 may be re-centered to place the newly added relative's node in the center of the screen.

Figure 5A:
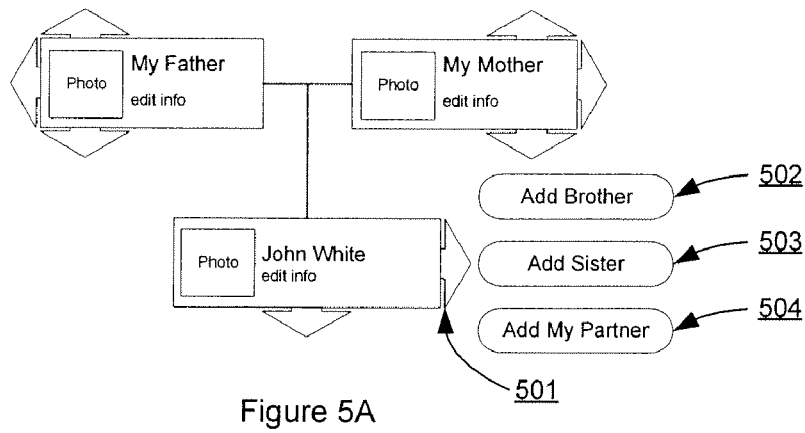
FIG. 5A illustrates an exemplary user interface for adding new family members, according to one embodiment.

FIG. 5A illustrates an exemplary user interface for adding new family members, according to one embodiment. When the user hovers his cursor on or clicks the side arrow 501, additional clickable areas appear; for example, "add brother" 502, "add sister" 503 or "add my partner" 504. Clicking on a link will show a new interface enabling addition of a new node on the same level such as brothers, sisters and spouses.

Figure 5B:
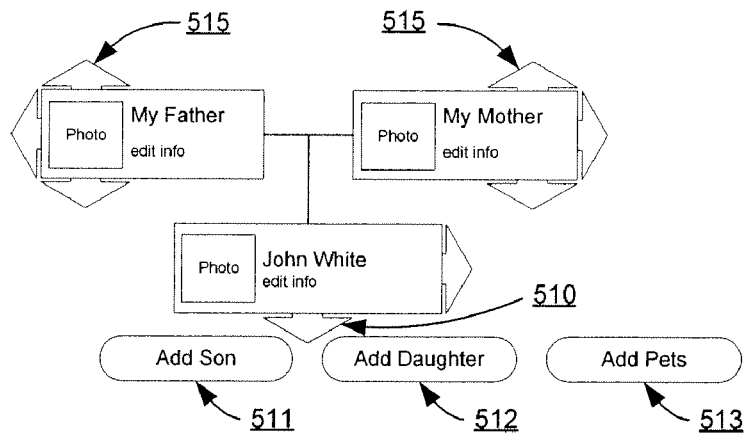
FIG. 5B illustrates an exemplary user interface for adding new family members, according to another embodiment.

FIG. 5B illustrates an exemplary user interface for adding new family members, according to another embodiment. Down arrows 510 are always shown to allow the user to add children at all times. When the user hovers his cursor on or clicks the side arrow 510, an additional clickable area for "add son" 511, "add daughter" 512 or "add pets" 513 appears. Up arrows 515 are used to add parents and are shown until both parents, whether living or deceased, have been added. According to one embodiment, pets may be added to the family tree map 100 as a child or a partner.

FIG. 6 illustrates an exemplary user interface for entering information associated with a node, according to one embodiment. According to one embodiment, profile entry interface 600 is a modal dialog and deactivates the rest of the tree map when displayed in the foreground of the Web site. One profile entry interface 600 is generally visible at any given time, and may be rendered in edit or read-only mode depending on the viewer's permission. It is noted that edit mode is available only to those who own the profile that the selected node represents or to those who are authorized editors of an unclaimed node. For the latter case, those members are usually blood relatives of the individual represented by the node. A similar interface is prompted when the user edits his/her own profile.

According to one embodiment, there are tabs on profile entry interface 600 and when selected, each tab displays particular fields. Basics tab 601 includes the fields 620 of first name, middle name, last name, suffix, e-mail address(es) 621, gender 622, date of birth 623, living relative check box 610, place of birth 624, date of death and place of death (when the living relative check box 610 is unchecked), current location 625 and occupation 626. About tab 602 includes the fields of "about me" text-input area, nickname(s), alias(es), appearance, ethnicity, religion, orientation, political views, languages, etc. Contact tab 603 includes home addresses, work addresses, phone numbers and contacts on the Web (such as messenger IDs). My Life tab 604 includes links to a personal Web page, blog, other community sites, a diary or any other links that the owner wants to share with the rest of the family. The user may also have private links that are only accessible/visible to the user. The accessibility of links may be restricted or limited by the owner. Favorites tab 605 includes one's interests, activities, people/heroes, cuisines, quotes, movies, TV shows, music, books, sports, etc.

Profile entry interface 600 displays combinations of information and control abilities depending on the state of the member and his/her profile. Profile entry interface 600 also displays a "save" button 627 and a "cancel" button 626 by default to confirm or cancel to confirm the changes.

Lines 102 interconnect nodes. According to one embodiment, the following rules of lines 102 may apply:

Lines 102 join nodes at standard connection points;

Lines 102 form right-angle corners rather than spanning distances diagonally;

Lines 102 are drawn so that nodes do not overlap;

Lines 102 may not cross except in limited instances (e.g., half siblings);

Lines 102 and nodes 101 are aligned along horizontal levels roughly indicating generations; and Birth order goes from left to right (i.e., oldest to youngest, except for the focus individual's parents' generation). For the generation one level above the focus level, the focus individual's parents are placed next to each other, and any siblings are placed on that level in the standard left-to-right birth order.

According to one embodiment, the surrounding Web page stacks multiple individuals' tree maps. This provides a breadcrumb trail that enables multipoint navigations. This functionality comes through two-way communication between the Web page and a widget that provides the breadcrumb trail. For example, refocusing the family map by clicking on the "open tree" icon of a node causes a new level to appear on the Web page. The new level appears immediately above the widget. As a new level appears, a breadcrumb trail is created providing a path back to the user's own tree map or previously appeared tree maps. Each level is represented by a thin horizontal bar that displays the following the focus individual's name, links to view the focus individual's family tree as a map and a list and a check box to show thumbnail photos.

The user may return to one of the stacked levels in the breadcrumb trail positioned above the widget by clicking on the link to the level. Any levels below the clicked level will disappear and the clicked tree map will move up in the page by refocusing on the new focus individual previously chosen.

Figures 7, 8:
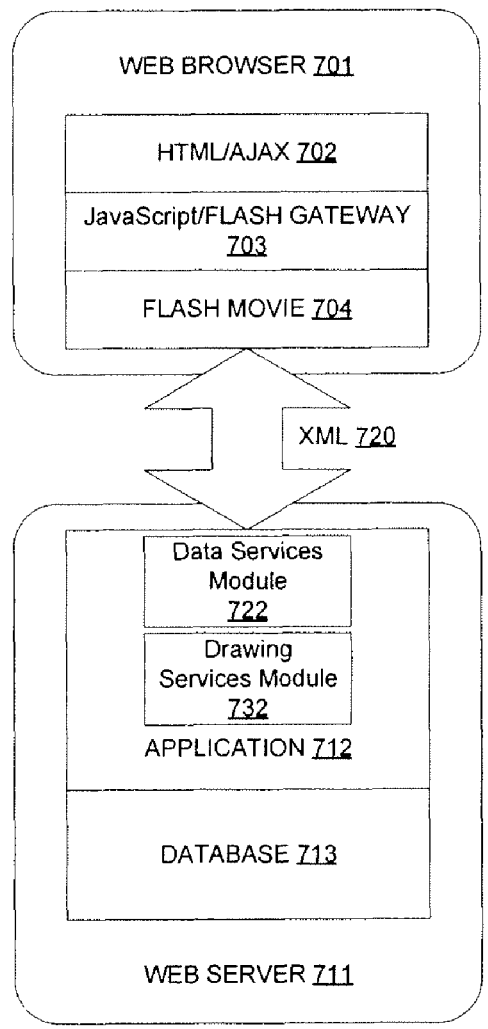
FIG. 7 illustrates an exemplary software architecture of the Web site providing a family tree map, according to one embodiment.
FIG. 8 is a table illustrating an exemplary numerical representation of multiple generations in a family, according to one embodiment.

FIG. 7 shows an exemplary software architecture of the Web site providing a family tree map 100. The system uses a client having a Web browser 701 and Web server 711 that connects to the client via a network. Application 712 includes data services module 722 that compiles data stored in database 713 for all members in a family tree. Data services module 722 provides data to Flash movie 704 that displays the family tree. Data services module 722 also handles the addition, deletion and editing of nodes in a family tree. Drawing services module 732 manages the organization of and display of nodes in a family tree as well as providing profile entry interface 600 for capturing node data. All functionalities having to do with drawing nodes in the family tree are contained in Flash movie 704 while the functionalities providing profile entry interface 600 are divided between Flash movie 704 and Web application 712. Other supporting features of the Web site and dynamically aggregated data in XML format 720 returned from Web application 712 are repackaged and displayed in interactive Web-presentable HTML 702 and/or asynchronous JavaScript™ programming language and XML (AJAX) 703. Navigation services include the navigation control allowing to move within a single family tree (zooming in and out, scrolling horizontally and vertically) and navigate between family trees. The functionality of navigation services is contained both in Flash movie 704 and in Web application 712.

All information about each individual is stored in database 713. This information includes background information, as well as photos and other user-created posts and media content files. Relationships linking individuals are also stored in database 713. In order to create a family tree for a given individual, blood relations and in-laws are selected, and their information is packaged into an efficient format—lightweight enough for timely transport to Flash movie 704, as well as comprehensive enough to allow Flash movie 704 to construct an accurate visual representation of all individuals and relationships. Data collection occurs in the as follows:

A focus individual is identified who may be a node 101;
The application 712 selects all individuals in database 713 related to the focus individual, including blood relatives and the current and previous spouses;
Various pruning rules are applied with the goal of including only those individuals that will eventually be drawn;
The application 712 arranges the final collection of the related individuals so that the focus individual is the first in the arrangement;
The application writes an XML file starting with headers, then adds XML nodes for the focus individual and all other relatives; and
The XML file 720 is made available to the Flash movie 704 at a designated location on Web server 711.

According to one embodiment, the data collection processes are initiated by Flash movie 704 that requests XML tree data 720 each time it attempts to render a family tree. Typically, Flash movie 704 sends the user ID of the focus individual to Web server 711, then waits for XML file 720 to be returned. Upon receiving XML file 720, Flash movie 704 draws the family tree consistent with the information contained in the XML file.

XML format is used to send family tree data to Flash movie 704. Individuals are represented as distinct entries (also known as nodes) in the XML document, with attributes set aside for ID, name, birth date and other data. A single family tree is created from each XML document that is sent to Flash movie 704, which, in turn, is designed to display just one tree at a time. Each XML document lists the focus individual first, followed by nodes for all other members of that individual's family tree. Relationship data is stored within each node, including parent/child and spouse/partner relationships. These are, in essence, additional tags identifying other nodes as being the subject of various relationship types.

A sample of the XML format may look like the following:

```
<?xml version='1.0'?>
<tree>
<person uid="1" lastname="Harley" firstname="David"
gender="male" born=
<parent uid="5"/>
<parent uid="6"/>
<partner uid="2" current="true" startdate="19900101"/>
<child uid="3"
<child uid="4"/>
</person>
<person uid="2" lastname="Harley" firstname="Tina"
gender="female" born
<partner uid="1" current="true" startdate="19900101"/>
<child uid="3"
<child uid="4"/>
</person>
<person uid="3" lastname="Harley" firstname="George"
gender="male" born
<parent uid="1"/>
<parent uid="2"/>
</person>
<person uid="4" lastname="Harley" firstname="Jacqueline"
gender="female"
<parent uid="1"/>
<parent uid="2"/>
</person>
</tree>
```

Different sets of data are returned from the Web server 711 depending on the nature of the request from the user. A full XML file is returned to fetch the full family tree when the request includes the user ID. Alternatively, only new and modified nodes in the family tree are returned, for example, as a partial XML file, when the family tree needs to be refreshed or updated. When a new node is added, all the relationships for the new node are calculated and integrated into the family tree, and a full XML file is returned. After editing an existing node, the information about the node and the related nodes is updated, and a full XML file is returned. After deleting an existing node, the information about the node is cleared and the relationships to the deleted nodes are revoked, and a full XML file is returned.

FIG. 8 is a table illustrating an exemplary numerical representation of multiple generations in a family, according to one embodiment. Generations are represented by integers by defining the focus individual and his/her siblings and cousins as Generation 0. Individuals in preceding or succeeding generations are assigned negative and positive integers, respectively. For example, the focus individual's parents are Generation −1, his/her grandparents are in Generation −2 and his/her children are Generation +1.

According to one embodiment, not every member of a family is displayed in the family tree. Instead, an individual's tree is pruned to display only the relatives in the individual's generation, one generation above (e.g., Generation −1, and all the generations below). For the generations displayed, all the descendants are shown. For all other generations including grandparents and above, i.e., Generations −2 and lower, only the descendants leading directly to the focus individual are shown. For example, a focus member's grandparents and all descendents are shown while the focus member's granduncle's descendents are pruned from the display. Arrows 110-112 are generally hidden when pruning is applied.

In-law families are pruned similarly to prevent line breakage in the opposite and upward direction. For example, when a focus individual has an uncle on his paternal side, the uncle may be married, but his wife's family is pruned because her siblings, parents and other relatives would cross over the horizontal lines connecting her husband to the members of his family. Pruned branches of a tree map can be opened by clicking on the tree map.

Pruned branches of a family tree are generally accessible by clicking an icon, for example, a small tree, attached to a node whose relatives have been pruned. The icon includes the count of the pruned nodes. Clicking on the icon allows the user to refocus the family tree and provides access to the pruned nodes.

Other pruning rules may apply. Adoptions are implicitly treated as blood relations. Spouse trees (in-law trees) are not shown to avoid overlapping lines, but an "open this tree" icon is displayed on the spouse node. For individuals two generations or more above the focus individual (e.g., Generation −2 and higher), only siblings, parents and spouses are shown. Children are pruned so that their branches do not cross over that of the focus individual. For individuals whose trees have been pruned, a "refocus on me" icon appears on their node allowing the user to click and view that user's entire family tree. This icon shows the count of individuals who are hidden in the pruned branch. For a pruned node, no arrows to add relatives are visible to prevent users from adding relatives that may already exist.

According to one embodiment, males are rendered with a light-blue background for their nodes and females are rendered with pink. Pets are rendered with green and gender-unknown individuals are rendered with grey. The focus individual is rendered with a white background. A different color scheme may be used to identify the gender and status of the node.

A husband is generally positioned on the left and wife is positioned on the right at the same level with a solid dark line connecting them. In the case of same-sex marriages, the parent with most genetic relatedness is positioned on the left. For a divorced family, the ex-husband is positioned on the left and the ex-wife is positioned on the right with a lighter weight line (or dotted line) connecting them.

Figure 5C:
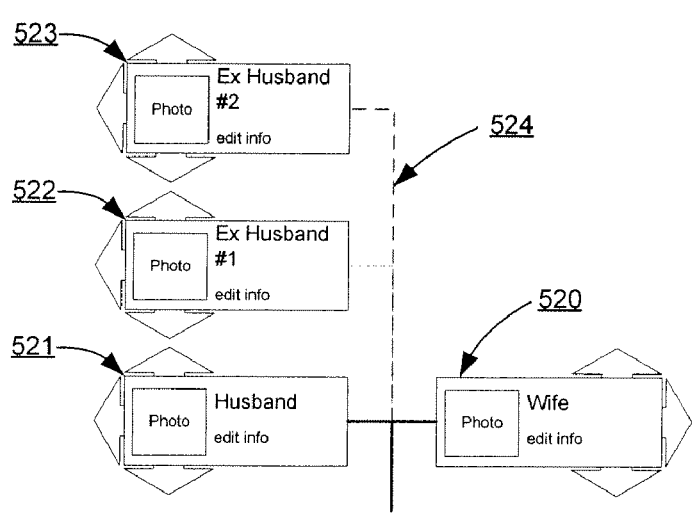
FIG. 5C illustrates an exemplary user interface having multiple marriages within a family tree, according to one embodiment.

FIG. 5C illustrates an exemplary user interface having multiple marriages within a family tree, according to one embodiment. Current marriage appears adjacent to the individual's node 520 and 521 while previous marriages 522 and 523 are farther out by reverse date order (i.e., the newer marriages are closer and the older marriages are farther out). A current marriage line is solid dark and occupies the lowest (vertical) position between the nodes. Previous marriage lines are stacked above, the newest to the oldest, with lower-strength lines, (or dotted line) 524 connecting them. When both sides remarried, the normal left/right husband/wife rule is applied. For the case of multiple remarriages, lines get lighter for marriages that are farther in the past. For a child out-of-wedlock, the unmarried parent is placed in horizontal order by the child's birth date. The marriage line is a light weight line (or dotted line), just as for a divorced or a deceased spouse.

In general, siblings are arranged from the left to the right, the oldest to the youngest with exceptions shown below.

There are exceptional rules that treat special cases when drawing a family tree. For the parents of the focus individual, also referred to as the focus parents, birth order is rearranged so that the husband and the wife are next to each other. This rule trumps all others rules described earlier.

To keep the focus parents adjacent to each other, the husband who is on the left side of the marriage relationship occupies what is usually the youngest sibling's position, the rightmost among siblings. The wife who is on the right side of the marriage relationship occupies the oldest sibling's position (leftmost among siblings). Number icons are used to call attention to this "out-of-line" arrangement.

If the focus individual's parents have remarried, the normal left/right husband/wife arrangement is trumped by the rule keeping the focus parents adjacent to each other. For a divorced couple where both have remarried, this exception flips the arrangement of their new spouses: the divorced couple remains adjacent to each other, with the man on the left and the woman on the right. The man's second/current wife is placed to his left, and the woman's second/current husband is placed to her right. Low/full-strength lines or dotted lines indicate the current/past marriages.

When a family tree becomes too large, a user's visible tree is limited by the following definition of a bounded tree. A bounded tree for a user includes all of the user's blood relatives and their partners, their current partners' blood relatives and their partners and the same bounded family members for the user's current partner if he/she exists. Depending on the inclusion and the boundary of a family tree, several trees are defined. A blood tree includes all of a user's blood relatives and their partners. A family tree generally includes a user's blood tree plus the user's current partner's blood tree. A forest is a user-facing term for a bounded tree and refers to the collection of blood trees in a bounded tree. An infinite tree includes all the users to which a user is connected via ancestry and marriage lines. A linked tree refers to the blood tree of a blood relative's current partner (e.g., the blood tree of the user's brother-in-law, the blood tree of a cousin's wife, the blood tree of a user's step-mother). A linked tree is linked by an active marriage. An ex-partner's tree is not linked. A visible tree is the subset of a user's blood tree drawn in the user interface 105.

When a user is added to a family tree, but the user's relationship to the existing tree members is unknown, the user may be added to the family tree but left unconnected. The system will provide a parking lot where unconnected family members reside until their relationship to the family members are identified.

Data created by users are stored in database 713. As the user participates in the family node, the user's actions are also stored and maintained in database 713. For example, if the user adds more family members, the count of family members on the family node increases. An invitation can be created and the status of the invitation gets updated as the invitee accepts or rejects the invitation.

FIG. 9A is an exemplary database table for a user profile, according to one embodiment. FIG. 9B is an exemplary database table for an invitation, according to one embodiment. The data type for each data field is predetermined and may have default values when created. For example, 'id', 'invitee_id' and 'inviter_id' are 32 bit integers; 'create_on' and 'updated_on' are 'datetime' types, which are one of the user-defined data types. Other data fields to facilitate the maintenance of the Web service, for example, 'blacklisted_users,' 'blocked_users,' 'number_of_current_users,' and 'total_profiles' are also utilized.

The system stores information about the participants in all family trees in a relational database such as database 713. The primary database table used to store each person is the 'profiles' data table and its exemplary data fields are as shown in FIG. 9A. Many other database tables relate users' data such as photos, events, text, messages, employment history, school history and more to each profile keyed on each profile's unique ID number. Elsewhere within the profile table, or in other database tables, each profile may relate to the following data:

- many other profiles of direct relatives such as parents, children, and spouses. Siblings may be implied via parent/child relationships;
- many photos, photo albums, and at least one photo tagged as a profile's primary photo;
- a collection of privacy preferences and web site preferences;
- many events, for example, birth event, death event, burial event, baptism event, and many life events;
- many email addresses, and one primary email address; and
- many geographical locations, or addresses, including one home address and one work address.

To represent a family tree, each participant is a node in the graph which points to X number of unions. Each union then points to N number of other nodes, and this continues over and over for the entire size of the family tree. Each union is a relational connection connected by either parent/children union or one of potentially many partner unions. Siblings are defined as nodes with identical parent unions. Note that sibling's nodes do not point directly to each other. Nodes always point to one or more unions and unions always point to many other nodes. Partner unions have sub-types of spouse, ex-spouse, partner, ex-partner, fiancé, etc.

With the structure of family trees using unions, any family relationship can be deduced such as half-siblings, step-siblings, step-children, cousins, nieces/nephews, grand parents, grand children, etc. To make these deductions, tree positioning system (TPS) coordinates are used to assign numeric values to each step in the graph.

| | |
|---|---|
| # 0,0 | me |
| # 0,0,0,0 | xwife |
| # 0,1 | child |
| # 1,1 | brother |
| # 1,0 | mom |
| # 1,0 | dad |
| # 1,1 | half_sis |
| # 1,0,0,0 | step_mom |
| # 1,0,0,0 | dad_xwife |
| # 1,0,0,1 | step_sis |
| # 0,0,0,1 | step_son |
| # 0,0,0,0 | wife |
| # 1,0,0,0,0,0 | step_mom_xhus |
| # 2,1 | uncle |
| # 2,1,0,0 | uncle_wife |
| # 0,0,1,0 | xwife_dad |
| # 0,0,0,0,0,0 | wife_xhus |
| # 2,0 | grandpa |
| # 0,2 | grandchild |
| # 1,1,0,0 | bro_wife |
| # 1,2 | nephew |
| # 2,2 | cousin |

Each step from a node to another node is represented by a group of numbers. For each move up the family tree to a parent node, the first number is incremented. For example, mom or dad is represented by (1,0) and a grandparent is represented by (2,0) since the move is two generations up in the family tree. For each move down the family tree to a child node, the second number is incremented. For example, a child is represented by (0,1). When moving cross a marriage relationship (or moving sideways), another set of numbers is added. For example, a wife is represented by (0,0,0,0). Numeric representation of relationship would ease the calculation from a node to another node to draw a family tree.

All unconnected family trees are identified by a unique family tree ID. A new family tree begins with a one single profile assigned a unique ID number, which also becomes that profile's family tree ID. As more family members are added to the family tree, the family tree ID is propagated to the new family members such that all family members in a family tree share a common family tree ID which equals to the profile ID of the first profile created in that family tree. When two unconnected family trees merge, one of the two existing family tree IDs is randomly selected to represent the new merged family tree. During the merger, the losing family tree ID is replaced with the winning family tree ID in all profiles of the losing family tree.

Family trees are always drawn from the point of view of a focus profile. To draw a family tree, Flash client on a Web browser 701 requests an XML or YAML document from Web server 711. Web server 711 traverses the family tree graph beginning with the focus node and following the rules for rendering a visible family tree map 100. As the family tree graph is traversed, one or more XML or YAML documents are generated which contain profile data such as name, gender, viral invitation status, etc., as well as X and Y coordinates in the user interface 105 used for drawing the family tree map 100. Tree rendering begins with the focus node and his/her descendants, and then the drawing algorithm crawls the family tree from the focus node's parents. The drawing algorithm calculates the X, Y coordinates of nodes in the following steps:

a. visit focus node and his/her parents' node, and recursively calculate the width of the sub-tree of each ancestor node such as father, grandfather and the width of each ancestor's node and all the other nodes attached to that node on the same row including great-uncle, ex-wives, ex-husbands, etc.; and b. place each ancestor's node, their spouses and siblings centered on their row according to the total width of their sub-tree. Each ancestor is placed in a row with all their siblings, half siblings and ex-spouses.

Nodes in a family tree may be deleted as long as deleting that node does not orphan any other nodes in the family tree. When a node is deleted, the profile and the associated data are deleted from the database. Before deleting the profile of the node, however, vital fields of the profile are copied to the 'dead_pools' database table for future reference.

A profile is considered unclaimed until a user of the system acknowledges that he/she is represented by the profile's node in a family tree. When claimed, the profile is marked as claimed and the 'claimed' field in the 'profiles' database table is changed from 0 to 1. All profiles start out as unclaimed except for the very first profile created in a family tree. A profile is claimed when:

- it is the very first profile that begins a new family tree,
- a user of the system accepts a viral invitation to join a family tree,
- or a user who was previously invited but did not accept the viral invitation attempts to log in to the system or attempts to start a new family tree based on profile matching using email addresses and/or any other profile data provided by the user.

Users of the system who have claimed their profiles may invite other users to their family trees by sending email messages, known as viral invitations, to family members who are not yet users of the system. If invitees are not already present in the family tree, those invitees remain unconnected and stored in the 'family_floaters' database table. Before an invitee accepts an invitation to join a family tree, other users with claimed profiles in that family tree may also invite the same invitee.

Each pair of inviter and invitee is stored in the 'pester_logs' database table for tracking the invitation status. The records of sent email messages are also stored in the 'sent_email_logs' database table. Each viral invitation email message contains a HTTP hyperlink that can be clicked by the invitee to accept the invitation. Each HTTP hyperlink contains a unique code that is used to match the invitation message to its rows in the 'sent_email_logs' and 'pester_logs' database tables. This unique code is used to verify that the invitation is valid and can only be used by the intended invitee. When the invitee follows the link, he/she is asked to verify that he/she is the same person represented by the invitee profile. When the verification succeeds, the profile is marked as claimed and the 'claimed' column is changed from 0 to 1 in the 'profiles' database table. The ID of the 'sent_email_logs' row for the claimed profile is recorded in the 'claiming_email_id' column in the 'profiles' database table.

Unconnected people, who are not necessarily users of the system, are stored in the 'family_floaters' database table, which stores at least first name, last name, and gender. When a user of the system moves an unconnected person into the appropriate position in his/her family tree, a new profile is created with the same first name, last name, and gender, and the row in 'family_floaters' is removed and the new profile is connected to the family tree. When a conflict arises by another user of the family tree, the connection to the newly added person may be revoked and the profile created for the person is deleted and the necessary data is restored to the 'family_floaters' database table.

Figure 10:
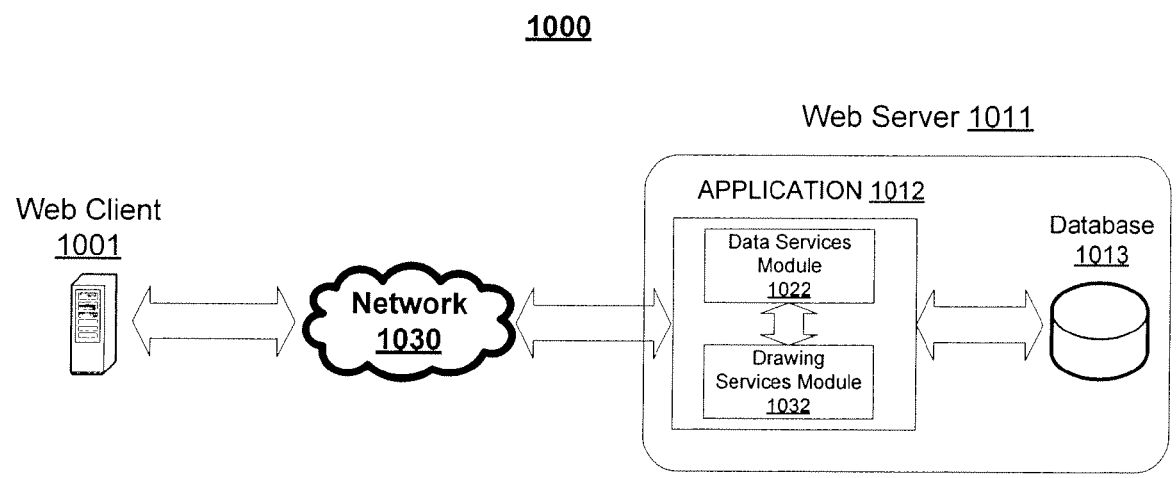
FIG. 10 is an exemplary network architecture, according to one embodiment.

FIG. 10 is an exemplary network architecture 1000, according to one embodiment. Web server 1011 is equipped with application 1012 including data services module 1022 and drawing services module 1032. Application 1012 accesses database 1013 to retrieve data associated with family trees. A user connects to Web Server 1011 using a Web client 1001 via network 1030.

According to one embodiment, network 1030 is a high-speed broadband network, a Public Switched Telephony Network (PSTN), a Local Area Network (LAN), a Wide Area Network (WAN), an Integrated Services Digital Network (ISDN) or any other type of network that enables Web server 1011 and Web client 1001 to exchange information. Furthermore, network 1030 may be in whole or in part a Wireless Area Network (WAN), such that Web client 1001 may be a wireless device, a cellular phone, a PDA, or any other type of wireless communication device.

Database 1013 may be of any type of database or file storage device, for example, a relational database, a distributed file system, a Redundant Array of Independent Drive (RAID), a Network Attached Storage (NAS) or any other type of storage devices. Database 1013 may also refer to the content or files available on the Internet or network 1030.

Figure 11:
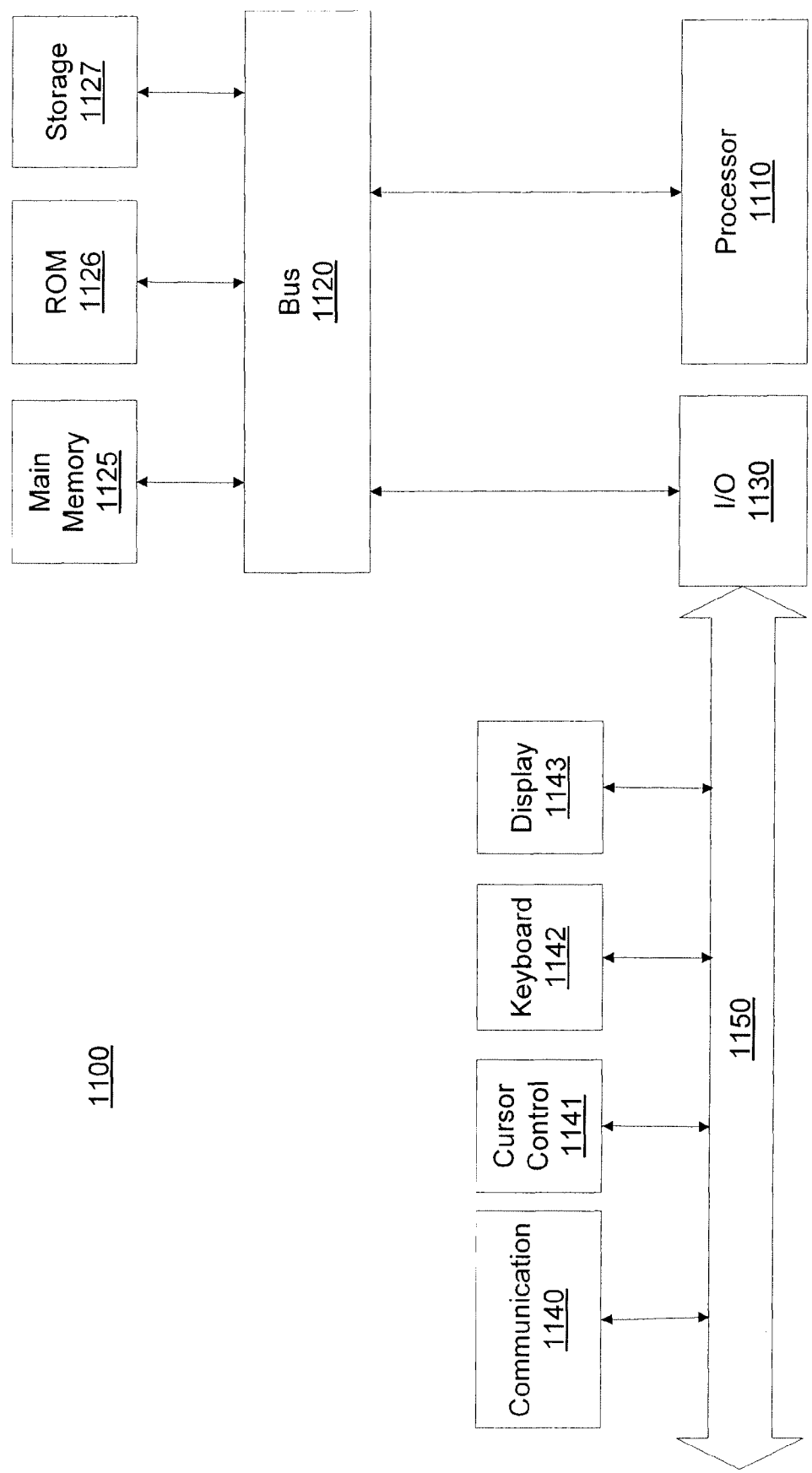
FIG. 11 illustrates an exemplary computer architecture for use with the present system, according to one embodiment.

FIG. 11 illustrates an exemplary computer architecture for use with the present system, according to one embodiment. Computer architecture 1100 can be used to implement a client 1001 or a server 1011 of FIG. 10. One embodiment of architecture 1100 comprises a system bus 1120 for communicating information, and a processor 1110 coupled to bus 1120 for processing information. Architecture 1100 further comprises a random access memory (RAM) or other dynamic storage device 1125 (referred to herein as main memory), coupled to bus 1120 for storing information and instructions to be executed by processor 1110. Main memory 1125 also may be used for storing temporary variables or other intermediate information during execution of instructions by processor 1110. Architecture 1100 also may include a read only memory (ROM) and/or other static storage device 1126 coupled to bus 1120 for storing static information and instructions used by processor 1110.

A data storage device 1127 such as a magnetic disk or optical disc and its corresponding drive may also be coupled to computer system 1100 for storing information and instructions. Architecture 1100 can also be coupled to a second I/O bus 250 via an I/O interface 1130. A plurality of I/O devices may be coupled to I/O bus 1150, including a display device 1143, an input device (e.g., an alphanumeric input device 1142 and/or a cursor control device 1141).

The communication device 1140 allows for access to other computers (servers or clients) via a network. The communication device 1140 may comprise a modem, a network interface card, a wireless network interface or other well known interface device, such as those used for coupling to Ethernet, token ring, or other types of networks.

An apparatus and method for providing a networked viral family tree have been described with respect to specific example and subsystems. It will be apparent to those of ordinary skill in the art that it is not limited to these specific examples or subsystems but extends to other embodiments as well without deviating from the concept of the invention.

What is claimed is:

1. A computer-implemented method, comprising:

receiving a first profile from a first client, the first profile including a first e-mail address;

checking the first profile against existing profiles in an existing family tree in a database;

notifying the first client of a conflict if the first profile matches one of the existing profiles;

receiving a second e-mail address from the first client, the second e-mail address being associated with a second profile, the second profile being created dynamically when the first client provides the second e-mail address;

sending an invitation to the second e-mail address to provide additional profile information associated with the second profile;

associating one or more relationships to the first profile and the second profile to generate a family tree;

assigning a numerical value in a coordinate system to each relationship in the family tree;

using the numerical value in the coordinate system to position each relationship in the family tree;

wherein the first client is a first focus individual upon which the coordinate system is centered;

wherein the center of the coordinate system changes with a change of the first focus individual to a second focus individual;

wherein the change of the first focus individual to the second focus individual redraws a new family tree associating the one or more relationships to a profile of the second focus individual;

wherein redrawing a new family tree associating the one or more relationships to a profile of the second focus individual comprises recalculation of the one or more relationships from the second focus individual point of view; and providing one or more user interfaces through which the first client provides a plurality of e-mail addresses corresponding to members of the family tree and associated with of a plurality of profiles.

2. The computer-implemented method of claim 1, further comprising associating a respective status with each profile of the plurality of profiles, the respective status including one of unclaimed and registered.

3. The computer-implemented method of claim 2, further comprising:
   allowing each member of a family to manage an unclaimed profile jointly; and
   allowing a registered profile to have password protection to restrict access to the registered profile.

4. The computer-implemented method of claim 3, further comprising customizing a first display of the family tree for a registered user owning the registered profile; and customizing a second display of the family tree for a second registered user owning a second registered profile.

5. The computer-implemented method of claim 4, wherein customizing the second display includes automatically pruning the family tree to illustrate the second registered user in the center of the family tree, and to illustrate predetermined generation levels specific to the second registered user when the second registered user accesses the family tree.

6. The computer-implemented method of claim 5, further comprising collapsing one or more of the predetermined generation levels to reveal additional generation levels.

7. The computer-implemented method of claim 1, further comprising generating a computer-implemented social network for members of the family tree, wherein the social network includes one or more of instant messaging, electronic mail, blogging, photo-albums, and on-line diaries.

8. The computer-implemented method of claim 3, further comprising notifying one or more members of the family when a change is made to an unclaimed profile that is part of the family.

9. The computer-implemented method of claim 1, wherein the one or more relationships include married, divorced, child, parent, cousin, grandparent, sibling, grandchild, great grandparent, great grandchild, aunt, and uncle.

10. The computer-implemented method of claim 1, further comprising combining a second family tree with the family tree when the second family tree and the family tree have a common profile.

11. A non-transitory computer-readable medium having stored thereon a plurality of instructions, the plurality of instructions when executed by a computer, cause the computer to perform:
   receiving a first profile from a first client, the first profile including a first e-mail address;
   checking the first profile against existing profiles in an existing family tree in a database;
   notifying the first client of a conflict if the first profile matches one of the existing profiles;
   receiving a second e-mail address from the first client, the second e-mail address being associated with a second profile, the second profile being created dynamically when the first client provides the second e-mail address;
   sending an invitation to the second e-mail address to provide additional profile information associated with the second profile;
   associating one or more relationships to the first profile and the second profile to generate a family tree;
   assigning a numerical value in a coordinate system to each relationship in the family tree;
   using the numerical value in the coordinate system to position each relationship in the family tree;
   wherein the first client is a first focus individual upon which the coordinate system is centered;
   wherein the center of the coordinate system changes with a change of the first focus individual to a second focus individual;
   wherein the change of the first focus individual to the second focus individual redraws a new family tree associating the one or more relationships to a profile of the second focus individual; and
   wherein redrawing a new family tree associating the one or more relationships to a profile of the second focus individual comprises recalculation of the one or more relationships from the second focus individual point of view; and
   providing one or more user interfaces through which the first client provides a plurality of e-mail addresses corresponding to members of the family tree and associated with of a plurality of profiles.

12. The non-transitory computer-readable medium of claim 11, having stored thereon additional instructions, the additional instructions when executed by a computer, cause the computer to further perform associating a respective status with each profile of the plurality of profiles, the respective status including one of unclaimed and registered.

13. The non-transitory computer-readable medium of claim 12, having stored thereon additional instructions, the additional instructions when executed by a computer, cause the computer to further perform:
   allowing each member of a family to manage an unclaimed profile jointly; and
   allowing a registered profile to have password protection to restrict access to the registered profile.

14. The non-transitory computer-readable medium of claim 13, having stored thereon additional instructions, the additional instructions when executed by a computer, cause the computer to further perform customizing a first display of the family tree for a registered user owning the registered profile;
   and customizing a second display of the family tree for a second registered user owning a second registered profile.

15. The non-transitory computer-readable medium of claim 14, wherein customizing the second display includes automatically pruning the family tree to illustrate the second registered user in the center of the family tree, and to illustrate predetermined generation levels specific to the second registered user when the second registered user accesses the family tree.

16. The non-transitory computer-readable medium of claim 15, having stored thereon additional instructions, the additional instructions when executed by a computer, cause the computer to further perform collapsing one or more of the predetermined generation levels to reveal additional generation levels.

17. The non-transitory computer-readable medium of claim 11, having stored thereon additional instructions, the additional instructions when executed by a computer, cause the computer to further perform generating a computer-implemented social network for members of the family tree, wherein the social network includes one or more of instant messaging, electronic mail, blogging, photo-albums, and on-line diaries.

18. The non-transitory computer-readable medium of claim 13, having stored thereon additional instructions, the additional instructions when executed by a computer, cause the computer to further perform notifying one or more members of the family when a change is made to an unclaimed profile that is part of the family.

19. The non-transitory computer-readable medium of claim 11, wherein the one or more relationships include married, divorced, child, parent, cousin, grandparent, sibling, grandchild, great grandparent, great grandchild, aunt, and uncle.

20. The non-transitory computer-readable medium of claim 11, having stored thereon additional instructions, the additional instructions when executed by a computer, cause the computer to further perform combining a second family tree with the family tree when the second family tree and the family tree have a common profile.

* * * * *